US012584733B2

(12) United States Patent
Yoav et al.

(10) Patent No.: US 12,584,733 B2
(45) Date of Patent: Mar. 24, 2026

(54) THIN FILM THICKNESS ADJUSTMENTS FOR THREE-DIMENSIONAL INTERFEROMETRIC MEASUREMENTS

(71) Applicant: Orbotech Ltd., Yavne (IL)

(72) Inventors: Nachum Yoav, Yavne (IL); Yulia Lovsky, Yavne (IL); Ronen Levy, Yavne (IL)

( * ) Notice: Subject to any disclaimer, the term of this patent is extended or adjusted under 35 U.S.C. 154(b) by 216 days.

(21) Appl. No.: 18/230,613

(22) Filed: Aug. 4, 2023

(65) Prior Publication Data

US 2025/0044073 A1     Feb. 6, 2025

(51) Int. Cl.
| | |
|---|---|
| *G01B 11/24* | (2006.01) |
| *G01B 9/02015* | (2022.01) |
| *G01B 9/02055* | (2022.01) |
| *G01B 11/06* | (2006.01) |
| *G01N 21/95* | (2006.01) |

(52) U.S. Cl.
CPC ...... *G01B 11/2441* (2013.01); *G01B 9/02029* (2013.01); *G01B 9/0207* (2013.01); *G01B 9/02075* (2013.01); *G01B 9/02079* (2013.01); *G01B 11/06* (2013.01); *G01N 21/9501* (2013.01); *G01B 2210/56* (2013.01)

(58) Field of Classification Search
CPC .............. G01B 9/02029; G01B 9/0207; G01B 9/02075; G01B 9/02079; G01B 11/06; G01B 11/2441; G01B 2210/56; G01N 21/9501
See application file for complete search history.

(56) References Cited

U.S. PATENT DOCUMENTS

| | | | |
|---|---|---|---|
| 6,304,330 B1 | 10/2001 | Millerd et al. | |
| 6,956,658 B2 | 10/2005 | Meeks et al. | |
| 7,324,210 B2 | 1/2008 | De Groot et al. | |
| 9,147,102 B2 | 9/2015 | Koren et al. | |
| 10,541,164 B2 | 1/2020 | Cheng et al. | |
| 10,830,709 B2 | 11/2020 | Smith | |
| 2004/0080757 A1* | 4/2004 | Stanke ............... | G01N 21/9501 |
| | | | 356/601 |
| 2009/0021723 A1* | 1/2009 | De Lega ............ | G01B 9/02027 |
| | | | 356/73 |

(Continued)

FOREIGN PATENT DOCUMENTS

| | | | |
|---|---|---|---|
| CN | 111664802 A | * | 9/2020 |
| JP | 7083695 B2 | | 11/2019 |
| WO | 2022013703 A1 | | 1/2022 |

OTHER PUBLICATIONS

Ku, Yi-Sha et al. "Metrology for Measuring Bumps in a Projection Layer Based on Phase Shifting Fringe Projection". Applied Sciences 2022, 12(2), 898. (Year: 2022).*

(Continued)

*Primary Examiner* — Michael A Lyons
(74) *Attorney, Agent, or Firm* — Hodgson Russ LLP

(57) ABSTRACT

A 3D surface map of a workpiece is determined using an interferometric quantitative phase imaging technique. The workpiece includes a transparent thin film or layers stack. The 3D surface map is corrected based on a thickness and a refractive index of the transparent thin film or layers stack. This technique can be used with an inspection system configured to perform an interferometric quantitative phase imaging.

19 Claims, 6 Drawing Sheets

(56) References Cited

U.S. PATENT DOCUMENTS

| | | | |
|---|---|---|---|
| 2014/0093986 A1* | 4/2014 | Popescu | G01B 11/2441 |
| | | | 438/16 |
| 2018/0195855 A1* | 7/2018 | Liu | G01N 21/9501 |
| 2020/0357704 A1 | 11/2020 | Schaefer | |
| 2021/0247328 A1* | 8/2021 | Nam | H01L 21/67259 |
| 2021/0285893 A1 | 9/2021 | Okuzono et al. | |
| 2022/0011088 A1* | 1/2022 | Boulanger | G01B 9/02088 |

OTHER PUBLICATIONS

Zhou, Renjie et al. "Semiconductor defect metrology using laser-based quantitative phase imaging". Quantitative Phase Imaging, Proc. of SPIE vol. 9336, 2015. (Year: 2015).*

Ku et al., Metrology for Measuring Bumps in a Protection Layer Based on Phase Shifting Fringe Projection, Applied Sciences, 2022, 12, 898.

Balak, Improving the Accuracy of Bump Height and Coplanarity Measurement, Semiconductor Digest, https://sst.semiconductor-digest.com/2016/12/improving-the-accuracy-of-bump-height-and-coplanarity-measurement/, retrieved Aug. 4, 2023.

Kim et al., Thickness Measurement of a Transparent Thin Film Using Phase Change in White-Light Phase-Shift Interferometry, Current Optics & Photonics, Oct. 2017, vol. 1, No. 5, 505-513.

* cited by examiner

200

THIN FILM THICKNESS ADJUSTMENTS FOR THREE-DIMENSIONAL INTERFEROMETRIC MEASUREMENTS

FIELD OF THE DISCLOSURE

This disclosure relates to measuring three-dimensional features on a workpiece.

BACKGROUND OF THE DISCLOSURE

Evolution of the semiconductor or flat panel manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for a semiconductor manufacturer.

Inspection processes are used at various steps during manufacturing to detect defects to promote higher yield in the manufacturing process and, thus, higher profits. Inspection has always been an important part of fabricating integrated circuits (ICs). However, as the dimensions of devices decrease, inspection becomes even more important to the successful manufacture of acceptable devices because smaller defects can cause the devices to fail. For instance, as the dimensions of devices decrease, detection of defects of decreasing size has become necessary because even relatively small defects may cause unwanted aberrations in the devices.

2D imaging is a common inspection technique. Demand for 3D imaging is increasing. Advanced inspection is needed for new designs, such as accurately measuring tilt of devices; accurate height measurements for bumps, microbumps, or pillars; or other 3D measurements on a densely-packed surface with both reflective and transmitting layers in a single field of view.

In relatively large structures provided as part of a semiconductor wafer, hemispherical bumps can have a diameter of around 100 µm, though other sizes are possible. Errors due to the presence of partially transparent layers of passivation or resist surrounding and/or supporting the bump can make it difficult to measure the height of such a bump from its base to its top. Conventionally, one or more measurements of the position of the plane that defines the base position of a large hemispherical bump are made and thereafter measurements of the top of the bumps are captured and used to compute the height of the bumps. Errors imposed by variability in the optical qualities of the structures of the integrated circuit device must be identified and minimized.

With some semiconductor wafer fabrication processes, a bump or pad is surrounded by a layer of passivation or protection material (e.g., dielectric, polyimide (PI), polybenzoxazole (PBO), benzocylobuene (BCB), etc.) or a layers stack. The bump may be electrically connected from below by a via or laterally by a trace. A bump is used to make an electrical connection either by means of mechanical contact (pressure) or by means of a solder connection. In both cases, the bump must satisfy certain physical criteria to be satisfactory. A bump that is too high may create difficulties in making connections to adjacent bumps. A bump that is too low may not make sufficient contact. An ideal scenario is one in which all of the bumps are the same height and to have the same profile. The same height and profile allows for predictable connections to be made.

A height measurement can be made relative to the substrate (e.g., bottom surface of the surrounding transparent layer stack) or a height measurement can be made relative to the top surface of the transparent layers stack. Such a height (co-planarity) measurement is needed over small size dies or over the full wafer.

Height measurement also can be used for a flat electronic device that is located on a planarization layer (e.g., directly or with electrical contacts inside the layer). The tilts for each flat pad or device can be measured relative to the substrate (e.g., bottom of transparent layers stack) or a top transparent surface.

One way to measure bump height and profile is laser triangulation. Laser triangulation involves directing a focused laser onto a surface and measuring the position of the reflected light (spot). As the angle of incidence and the angle of reflection are the same by definition, deviation of the reflected light is due to the height of the surface being measured. Using a sensor such as a position sensing device (PSD) or a charge-coupled device (CCD)/complementary metal-oxide semiconductor (CMOS) camera, the height of a bump can be measured. Moving the device that is under test relative to the laser allows multiple positions of the device to be measured. Relative motion between a focused laser spot of a laser triangulation sensor and a device under test involves some combination of moving the device upon a stage, raster scanning a focused laser spot, focusing the laser to a line, and/or imposing multiple laser spots at one time.

Thin film thickness measurement and optical properties characterization can be performed using a reflectometer. The phase shift within the thin film layers is calculated based on a thickness and the complex refractive index for each of the layers. This phase shift for each of the areas within a field of view is then used to correct the phase map into a surface map conversion.

Bump height inspection also can be performed with laser or white light triangulation methods. These methods suffer from measurement error due to different types of materials within the field of view and particularly, presence of a single transparent layer or a layers stack. Geometric correction of height measurement due to presence of a single transparent layer may be performed. Triangulation methods may also have other disadvantages when measuring bump heights, such as long scan time or bumps shadowing due to triangulation angle. Atomic force microscopy (AFM) is not an optical technique and is a slower method. However, the measurement accuracy is not affected by the type of materials being scanned and this method can be used as a ground truth in the stage of research and development rather than within the production line.

Previously, thickness film correction was implemented with optical triangulation techniques. This previous technique for film thickness correction was not suitable for quantitative phase imaging techniques because it is a geometrical correction. A measurement height inaccuracy of up to 20% could occur. Depending on the measurement wavelength, layer thickness, or the optical properties and of the materials, even a height inaccuracy of up to 100% could occur if thickness adjustment is not performed for quantitative phase imaging techniques. Geometrical correction for film thickness, such as used in the triangulation methods, is not applicable to quantitative phase imaging techniques. Therefore, improved systems and techniques are needed.

BRIEF SUMMARY OF THE DISCLOSURE

A system is provided in a first embodiment. The system includes a stage configured to hold a workpiece; an inspection system configured to perform an interferometric quantitative phase imaging; and a processor in electronic communication with the inspection system. The processor is configured to: determine a 3D surface map and correct the 3D surface map based on a thickness and a complex refractive index of the transparent thin film or layers stack. The workpiece includes a transparent thin film or layers stack near or on the feature.

The feature can be, for example, a bump, a micro-bump, a pillar, a metal-nail, an electronic device, or a transparent feature.

The workpiece can be, for example, a semiconductor wafer, flat panel, printed circuit board, or glass substrate.

The system can further include a reflectometer configured to measure the thickness and the refractive index.

The correcting may use a phase shift correction. The interferometric measurement technique may use only one wavelength, dual wavelength, multi-wavelength, coherent, partially-coherent, or non-coherent illumination.

The interferometric quantitative phase imaging can use coherent illumination, non-coherent illumination, or partially-coherent illumination.

A method is provided in a second embodiment. The method includes determining a 3D surface map of a workpiece using an interferometric quantitative phase imaging technique. The workpiece includes a transparent thin film or layers stack near or on the feature. Using a processor, the 3D surface map is corrected from the determining based on a thickness and a refractive index of the transparent thin film or layers stack.

The feature can be, for example, a bump, a micro-bump, a pillar, a metal-nail, an electronic device, or a transparent feature.

The workpiece can be, for example, a semiconductor wafer, flat panel, printed circuit board, or glass substrate.

The method can further include measuring the thickness and the refractive index using a reflectometer.

The correcting may use a phase shift correction. The interferometric measurement technique may use only one wavelength, dual wavelength, multi-wavelength, coherent, partially-coherent, or non-coherent illumination.

The interferometric quantitative phase imaging can use coherent illumination, non-coherent illumination, or partially-coherent illumination.

The thickness can be based on a measured phase difference between two points on the workpiece.

The refractive index may have a real part and an imaginary part.

A non-transitory computer-readable storage medium is provided in a third embodiment. The non-transitory computer-readable storage medium includes one or more programs for executing the following steps on one or more computing devices. A 3D surface map is received. The 3D surface map is determined using an interferometric quantitative phase imaging technique. The workpiece includes a transparent thin film or layers stack near or on the feature. The 3D surface map is corrected based on a thickness and a refractive index of the transparent thin film or layers stack.

The feature can be, for example, a bump, a micro-bump, a pillar, a metal-nail, an electronic device, or a transparent feature.

The workpiece can be, for example, a semiconductor wafer, flat panel, printed circuit board, or glass substrate.

The correcting may use a phase shift correction. The interferometric measurement technique may use only one wavelength or dual wavelength multi-wavelength, coherent, partially-coherent, or non-coherent illumination.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
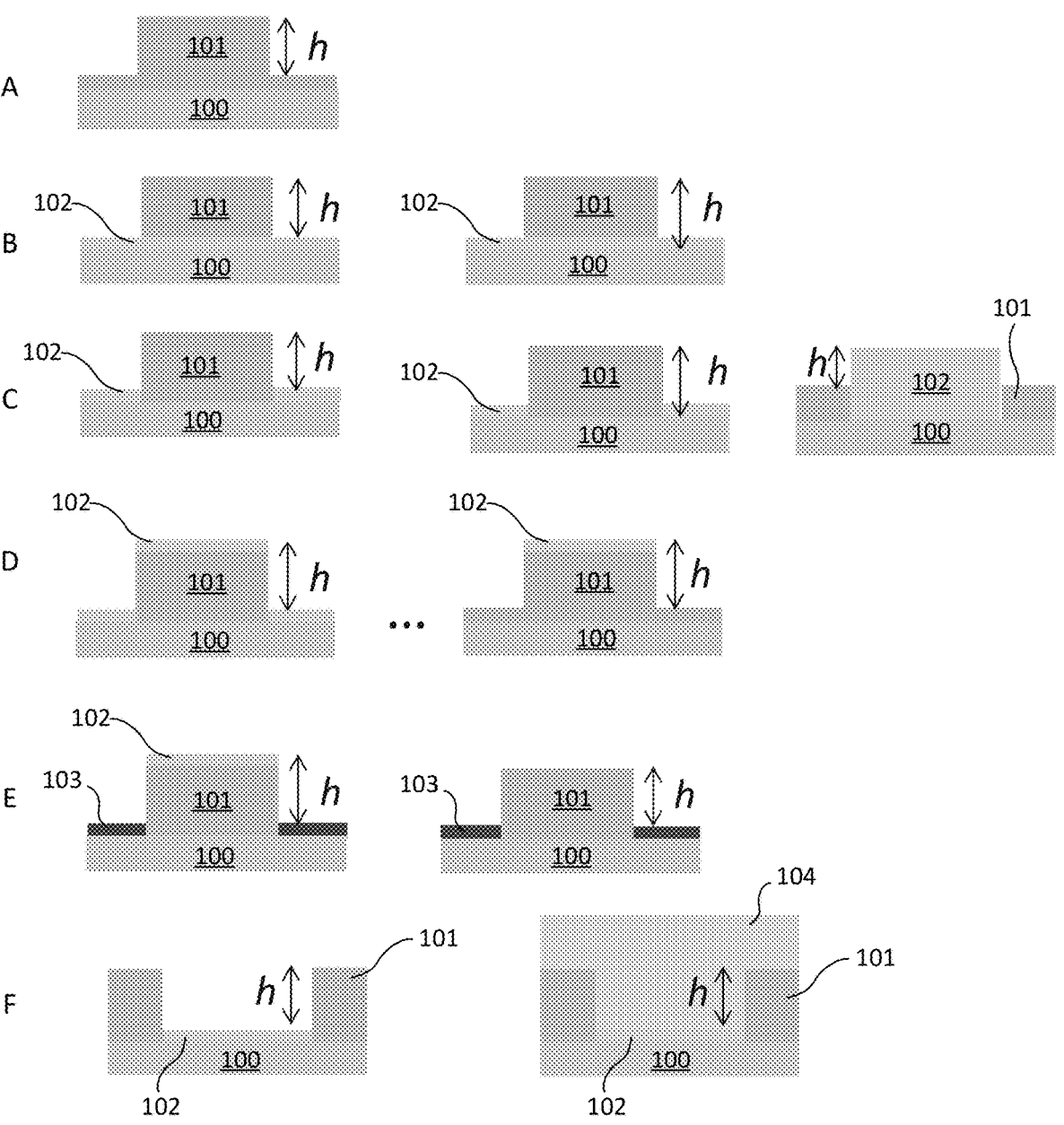
FIGS. 1A-1F show thin film correction in quantitative phase measurements.

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

3D measurements of features on a substrate can be performed using a variety of quantitative phase imaging techniques. These techniques output a phase map, which is converted into a surface map of the full field of view. When, different types of materials are present, including areas with thin/thick films or multi-layers stacks, the output of the height surface map is typically erroneous if no correction is used.

The embodiments can be used for multiple applications. In an instance, the disclosed embodiments can be used with wafer level packaging. This can include a substrate carrier such as a wafer, panel, board, or flexible carrier. Bumps with wafer level packaging can have a pitch of, for example, greater than 100 μm. Micro-bumps with wafer level packaging can have a pitch of, for example, a few tens of microns. Pillars with wafer level packaging can have a pitch of, for example, greater than a few microns. Metal-nails with wafer level packaging can, for example, have a pitch of less than a few microns and a height of a few nanometers above the transparent layer. In an instance, the disclosed embodiments can be used with flat panel displays. This can include a substrate carrier such as a wafer or glass. Transparent printed structures or electronic devices can be measured. In an instance, the disclosed embodiments can be used with integrated circuits. This can include materials such as FR4, polyimide, thermoset resins (e.g., BT), Ajinomoto Build-up Film (ABF), or epoxy resin. In an example, millimetric lateral size devices can be measured. The features shapes and/or sizes and manufacturing processes are different for these applications. Other applications are possible.

The disclosed thickness adjustment technique is relevant for height (e.g., 3D) measurements using one of a quantitative phase imaging method. This can be divided into two sub-categories: interferometric and non-interferometric methods for phase retrieval. The interferometric techniques can be categorized into on-axis and off-axis interferometry. Off-axis interferometry (when the reference beam and the sample beam are at an angle) can be used, for example, in digital holography microscopy (DHM). The angle enables application of a Fast Fourier Transform (FFT) on a single interferogram and extraction of a phase map of the surface. In on-axis interferometry, the angle between the reference and target beams is zero, and it is not possible to retrieve the phase map by FFT. Hence, for the on-axis interferometry the method for phase map extraction is phase-shift interferometry. A typical example for phase shift interferometric measurement is white light interferometry (WLI), where a stage (or the reference mirror or other part) is being scanned and a set of phase-shifted interferograms are captured within few seconds. As a final step, a phase map of the surface is produced using that set of images. Another measurement type is single shot phase shift interferometry, where surface phase map is obtained without any moving parts. The methods can be based on any type of interferometers, any illumination source (coherent, non-coherent, partially coherent) and any type of sensor. The output of the measurement is a phase map of a surface. The phase map is then converted into a topographical 3D surface map. This 3D surface map can show features and can include height information with the 2D arrangement.

Analyzing the phase map, a 3D surface map of the field of view is determined by using the relation between phase and height for a given wavelength. A challenge with any quantitative phase imaging method is measuring a surface where the reflective features are surrounded by a transparent layers stack.

The presence of a single transparent layer or transparent layers stack may cause erroneous height measurements. In addition, different reflective materials can each cause a slightly different phase shift to the reflected beam. Mixed materials surfaces are typical and rarely only a single material is imaged on the full field of view. For high precision tools, this can be compensated for when a height map is measured.

Embodiments disclosed herein include a transparent film thickness or layers stack measurement followed by a calculation that corrects for the inaccurate height measurement of 3D features surrounded by a transparent layer or layers stack. This can be any combination of reflective or transparent features shown in FIGS. 1A-1F. 3D measurement of a surface that includes 3D features and a transparent layer or layers stack achieved by an interferometric quantitative phase imaging technique. Each pixel in the surface map is be corrected based on the thickness and optical properties (e.g., complex refractive index) of the transparent film layer or layers stack and the optical properties of the different materials within the field of view.

Figure 2:
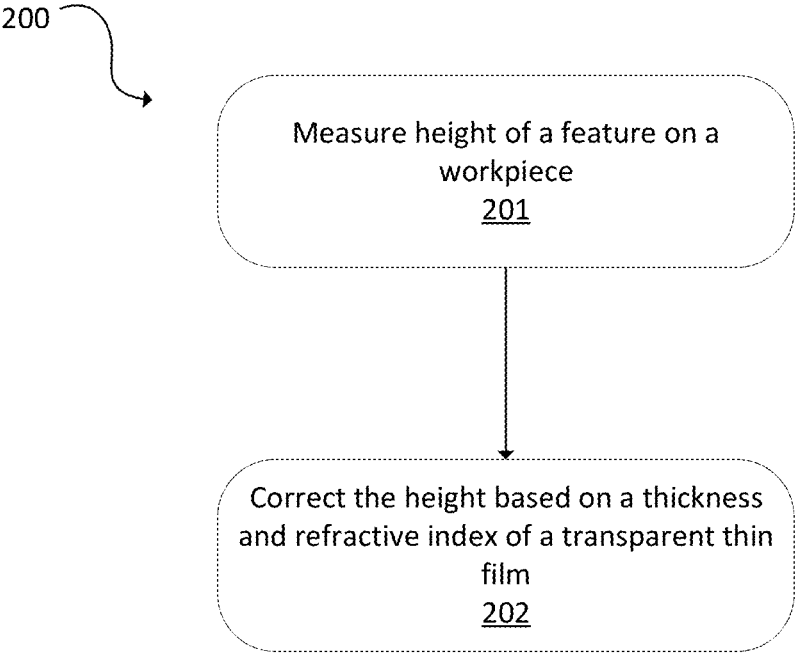
FIG. 2 is a flowchart of a method in accordance with the present disclosure.

FIG. 2 is a flowchart of a method 200. A height of a feature on a workpiece is measured using an interferometric quantitative phase imaging technique 201. The workpiece includes mixed areas of reflective and/or transparent features or layers. Using a processor, the measurement is corrected at 202 based on a thickness and a complex refractive index of the transparent thin film and based on optical properties of each of the layers or features. For example, the measurement can be corrected based on thickness and a refractive index of the transparent thin film or layers stack. In an instance, the feature is a bump. The workpiece can be a flat panel or another substrate.

In a particular instance, a 3D surface map of a workpiece is determined at using an interferometric quantitative phase imaging technique. Then, using a processor, the 3D surface map is corrected based on a thickness and a refractive index of the transparent thin film or layers stack. Correcting the 3D surface map is an example of correcting the measurement at 202. The height of a feature can be measured to create a 3D surface map.

The workpiece can include a film. The film can be or can include a dielectric (e.g., $SiO_2$ or $SiN_x$), a polyimide (PI), polybenzoxazole (PBO), or benzocylobuene (BCB) (such as in redistribution layers (RDL) layers or planarization layers). Different passivation and/or protection layers also can be included. The feature can include one or more bumps, micro-bumps, pillars, or metal-nails (e.g., Cu) surrounded by passivation dielectric layers stack, which can be thin film or thick layers stack. The feature also can include Cu metal interconnects inside polyimide layers in RDLs, electronic devices positioned on top of layers stack of polyimide with or without additional dielectric layers, or other metal structures with or without transparent layers but on special substrates or integrated with conductive transparent materials. Other films, layers, or features are possible and these are merely examples.

Figure 3:
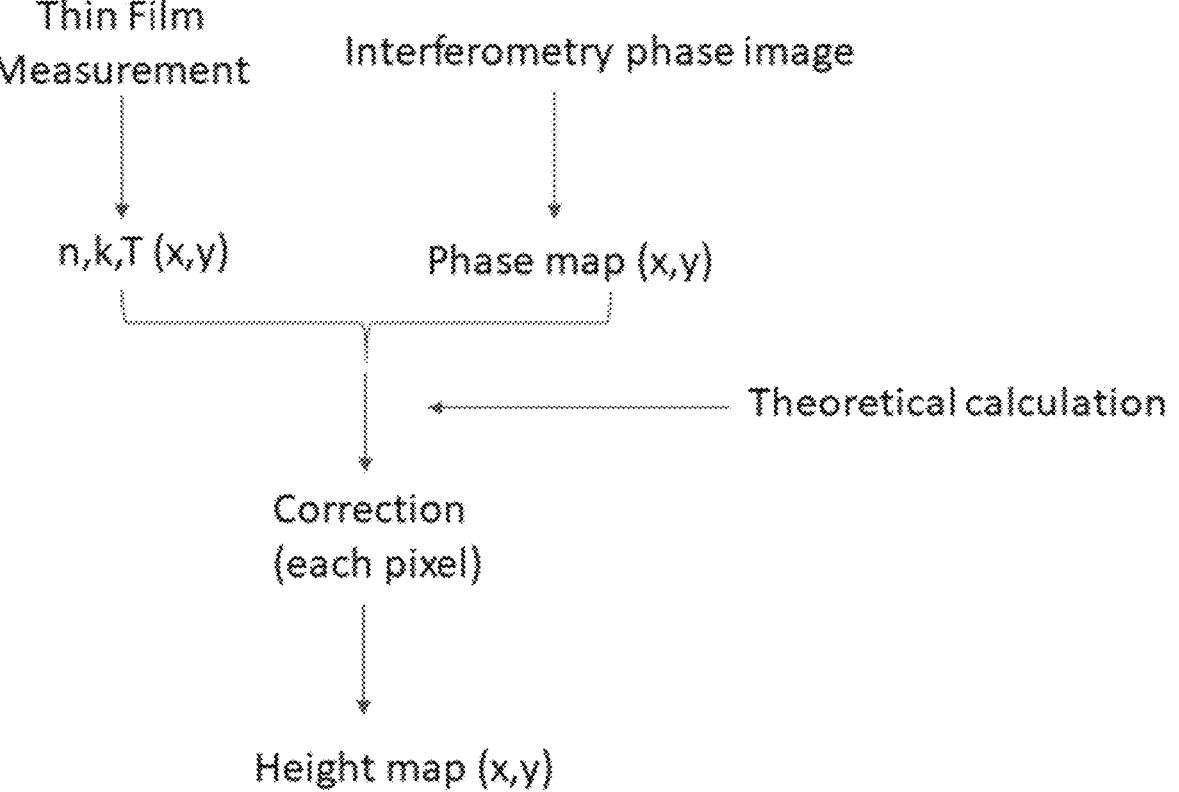
FIG. 3 is another flowchart illustrating an embodiment of the present disclosure.

FIG. 3 shows additional information about the method 200. As shown in FIG. 3, a thin film measurement determines n,k,T (x,y) and an interferometry phase image determines a phase map (x,y). Each pixel can be corrected to generate a height map (x,y). X and y can be perpendicular dimension across the workpiece or other variables.

The index of refraction has two parts: real and imaginary. The real part is labeled n. The imaginary part is labeled k and is sometimes called the extinction ratio. Each material (transparent or reflective) has a specific set of n,k values depending on the wavelength of illumination, which refers to the material's optical properties.

With respect to FIG. 3, the interferometry phase image can be formed using a quantitative phase interferometric imaging technique. The phase may can have a field of view that includes different types of materials. n,k,T (x,y) can be determined according to reflectometer measurements.

FIGS. 1A-1F shows the options when correction for quantitative phase measurements is needed. The height of a feature on the workpiece, such as a bump, is represented by height h. In an instance, h is approximately 10-12 μm from a surface of the bare workpiece or a surface of a transparent thin film, but other dimensions are possible. FIGS. 1A-1F shows simplified cross sections, while measurement and correction are applied to the full field of view. FIG. 1A is an example when no height adjustment is needed because it is the same type of material. FIG. 1B shows a device positioned (directly or not) on a transparent (e.g. planarization) layer. Height is measured relative to the top of the transparent layer or bottom of the transparent layer. FIG. 1C shows an adjustment for field of view with areas with a first material type 101 and areas with a second material type 102. Each can be reflective or transparent, which is a single layer or a transparent layer stack. FIGS. 1D-1F show other exemplary structures. Third material type 103 and fourth material type 104 also are shown. The embodiments of FIGS. 1A-1F can benefit from embodiments disclosed herein. Other structures or designs also can benefit from the embodiments disclosed herein, and FIGS. 1A-1F are merely examples.

In FIGS. 1A-1F, the substrate 100 can be thick and may be reflective or transparent. Examples of the substrate 100 materials include Si, metal, PBC, or glass. The first material type 101 is reflective, such as a semiconductor (SC) or metal. The second material type 102 is transparent, such as a dielectric, polyimide, PBO, or transparent conductive. The layer of the second material type 102 can be a single layer or layers stack. The third material type 103 may be selected from the same group of materials as the first material type 101. The fourth material type 104 is a transparent material, such as a dielectric. The layer of the fourth material type 104 can be a single layer or layers stack.

The index of refraction of the transparent thin film surrounding or underlying the bump is rarely known with specificity. The index of refraction may not be known during an inspection process, especially if devices are processed in multiple fabrication facilities. The complex index of refraction of a material affects the phase of the reflected light. This additional phase shift, due to difference of the materials, will be translated to a height measurement error.

In triangulation methods, only the real part of the refractive index (together with the layer thickness) is accounted for. In embodiments disclosed herein, both the real and the imaginary parts, together with thickness of each transparent layer, influence the phase shift due to reflection from the material or layers stack.

Figure 4:
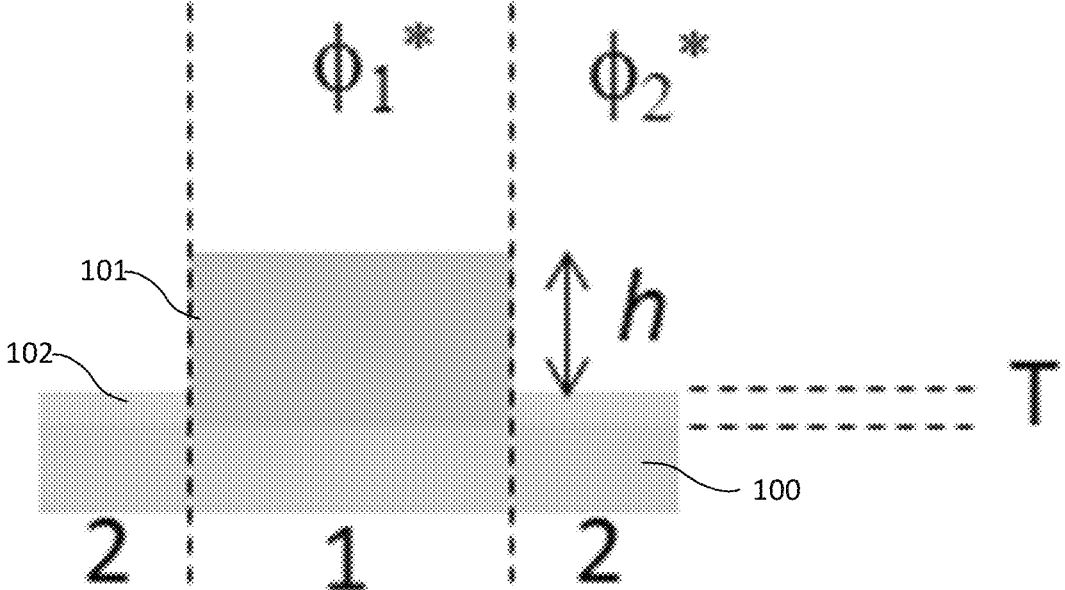
FIG. 4 shows phase shift correction principle.

FIG. 4 shows phase shift correction. The thickness and refractive index can be measured using a reflectometer. The thickness and refractive index may only be measured for the transparent layer. In an instance, the optical properties (n,k) are known a priori and only the thickness of the transparent layer is measured using the reflectometer. The optical properties or the type of the material for the reflective areas are needed as input.

The reflectometer measurement together with the known optical properties for each of the materials allows construction of a model for the phase shift introduced in each area within the field of view (marked in FIG. 4). In some cases the reflectometer is used to detect the presence of a thin transparent layer. For example, a layer that is not reported by the manufacturer beforehand. This can be used in the height correction.

The determination can use the following equations.

$$\Delta\Phi^* = \phi_1^* - \phi_2^* \qquad \text{(Eq. 1)}$$

$$\Delta\Phi^* = (\phi_1 + \phi_{m1}) - (\phi_2 + \phi_{m2}) \qquad \text{(Eq. 2)}$$

As shown in FIG. 4, area 1 in the center includes a first material type 101, such as a reflective material. Area 2 at the edge uses a different second material type 102, such as the substrate with a transparent layer or layers stack. In FIG. 4 and Equations 1-2, T is the transparent layer thickness, h is feature's height (which is the objective of the measurement), $\phi_1^*$ is the measured phase of the reflected light in area 1, $\phi_2^*$ is the measured phase of the reflected light in area 2, $\phi^*$ (x,y) is the measured phase map in each pixel (e.g. $\phi_1^*$ in area 1), and $\Delta\Phi^*$ is the measured phase difference between area 1 and area 2.

In general: $\Delta\Phi^* = \phi_1^* - \phi_2^* \pm C$. The zero of the phase map can be arbitrary chosen. An arbitrary constant, C, can be added or subtracted. It is not possible to derive h directly from $\Delta\Phi^*$ if area 1 and area 2 are of different materials. If area 1 and area 2 are two different materials, a correction should be applied to each of $\phi_1^*$ and $\phi_2^*$.

$\phi_1$ is the phase shift in area 1 due to optical path in air (e.g., $\phi_1=0$) and $\phi_2$ is the phase shift in area 2 due to optical path in air (e.g., $\phi_2=2*k*h$). In this instance, k is the wavenumber k=2 pi/wavelength, and the factor of 2 is due to the reflection mode. $\phi_{m1}$ is the calculated phase shift due to the first material type 101. $\phi_{m2}$ is the calculated phase shift due to the second material type 102. The correction to phase shift in area 1 is $\phi_1^* - \phi_{m1}$. The correction to phase shift in area 2 is $\phi_2^* - \phi_{m2}$.

$\Delta\Phi_0 = \phi_1 - \phi_2 \pm C$ is a phase difference after the correction, from which it is possible to determine h. $\Delta\Phi_0$ is linearly related to h.

The correcting in step 202 of method 200 can use a phase shift correction as disclosed herein. This can be used with an interferometric quantitative phase imaging technique.

The embodiments disclosed herein can be applied to bump height inspection when thin film layers are present on the workpiece. Phase adjustment calculations can be performed as part of the inspection.

Embodiments of the height (3D) measurement disclosed herein can be considered as a type of quantitative phase imaging. These methods include interferometric methods such as white light interferometry (WLI), phase shift measurements, single shot phase shift measurements, holographic methods, and some of the non-interferometric phase retrieval methods. In all these methods, as a last step, a phase map of a surface is produced, which is then converted into a height map. The conversion into a height map is typically by a linear relation, dependent on the wavelength. Embodiments disclosed herein can use a reflectometer, which can be used to measure the characteristics of a transparent material.

The phase map of a surface can relate linearly to the height map in case there is no spatial location that includes a different material or transparent layer or stack of layers. Reflection from different materials or a transparent layer or stack of layers not only differs in intensity, but also in phase. Thus, when a phase map is translated into a height map, a presence of different type of materials on the surface can accounted for. Embodiments disclosed herein account for the phase shift of light at each location create an accurate height map. The phase shift can be calculated from the complex refractive index of the material, and in case of a transparent layers or layers stack also from the thickness of each of the transparent layers.

The dependence of phase versus wavelength is theoretically calculated, given the known or measured optical properties of the materials, and, in case of a transparent layer, also the measured thickness of each layer. Then the additional phase shift can be added to the specific locations on the phase map and converted into a height map.

Figure 5:
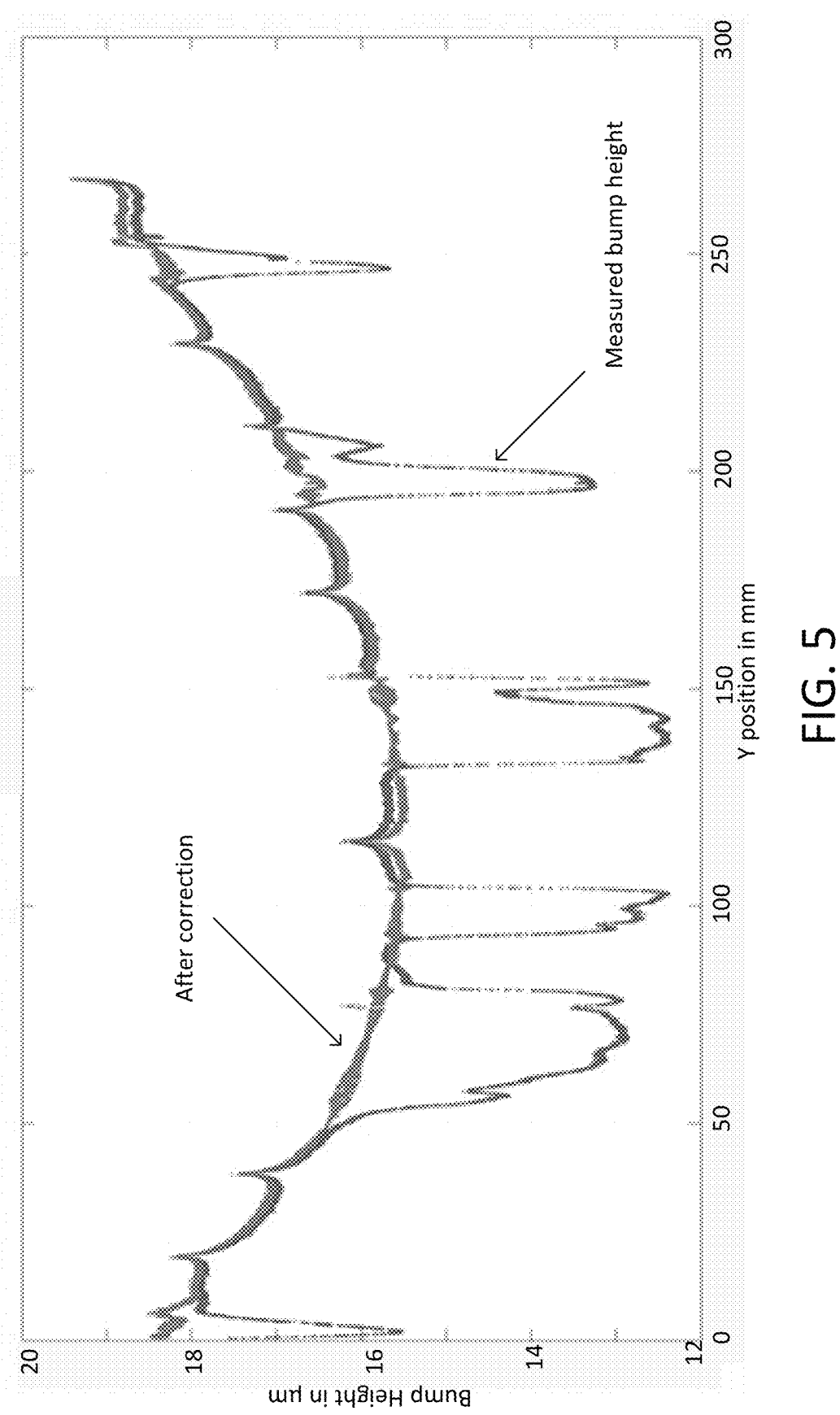
FIG. 5 is an example of layer effect correction based on reflectometer data using embodiments disclosed herein.

This method may enable improved accuracy during bump inspection when thin film layers are present on the workpiece. FIG. 5 is an example of layer effect correction based on reflectometer data. One line presents the measured feature (bump) height along a specific sample using a previous technique. The other line presents the measured feature (bump) height along a specific sample using an embodiment of this disclosure ("after correction").

3D interferometric measurements using single shot methods are inherently fast and accurate. In addition, they reach higher lateral resolution and are more accurate method than conventional triangulation. Hence, this technique is suitable to market demands related to dense and small features. These techniques can be used for wafer-level-packaging, such as bump height for bumps surrounded by a transparent layer or layers stack. These techniques also can be used with hybrid bonding, such as copper nails height or other metallic features surrounded by a transparent layer or layers stack.

These techniques can further be used with solder resist in printed circuit board (IC substrate) applications (e.g., with near-infrared (NIR) illumination).

Embodiments disclosed herein can use an additional module to measure the thin film layer thickness with improved accuracy. This module, which can be run on a processor, is based on a reflectometer solution.

Figure 6:
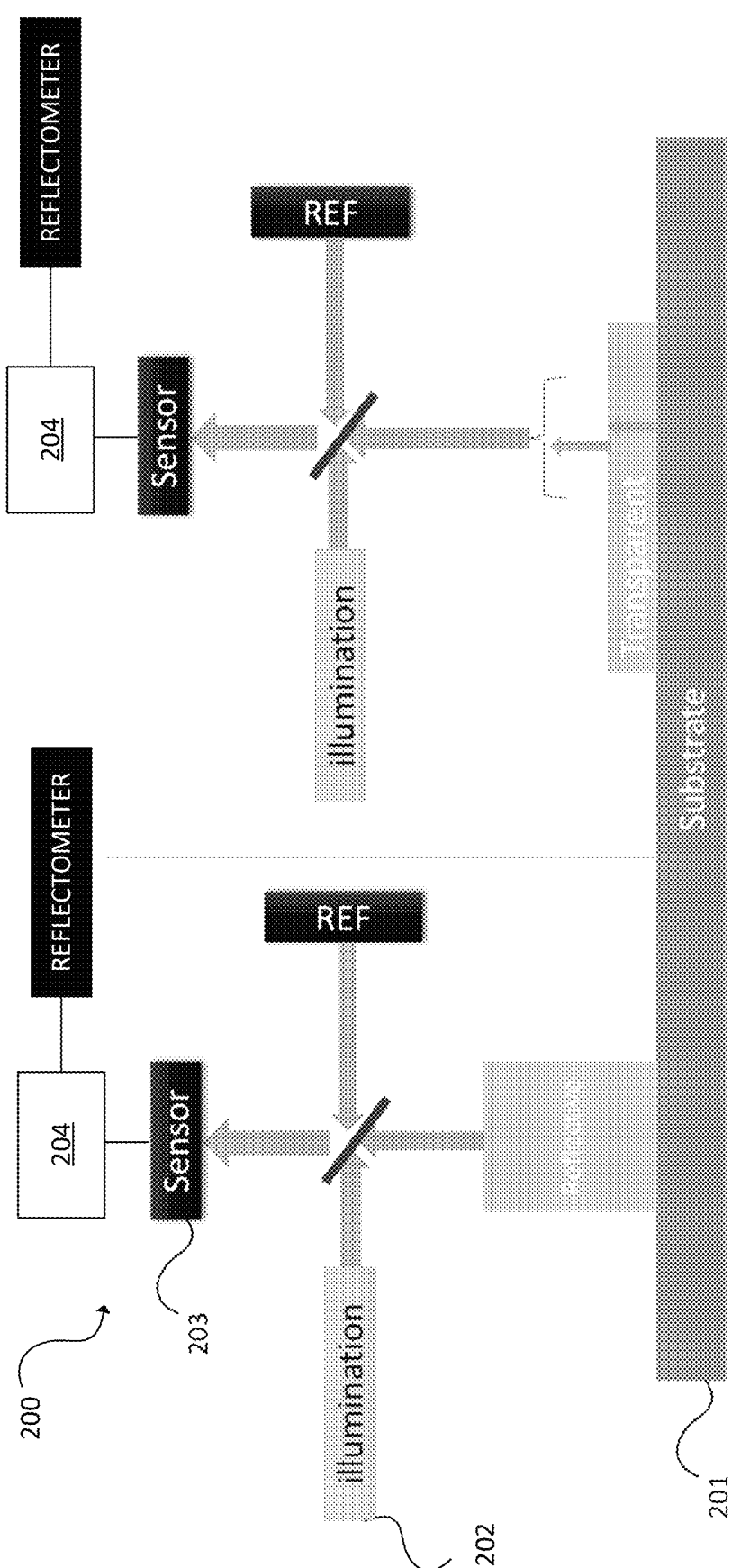
FIG. 6 is a diagram showing an example of interferometric measurement with a transparent layer.

FIG. 6 is a diagram showing an example of interferometric measurement with a transparent layer. The inspection system 200 includes a stage configured to hold the workpiece 201. The inspection system 200 is configured to perform an interferometric quantitative phase imaging technique. This inspection system 200 can include the illumination source 202 (e.g., coherent, non-coherent, or partially coherent) and sensor or multiple sensors 203. Both the reflective material (left) and transparent thin film (right) can be measured within the same field of view. A reference beam (REF) also is included. The illumination source 202 and the reference beam are both directed to an optical component, such a beam splitter, mirror, or other component.

A processor 204 can be in electronic communication with the inspection system 200. The processor 204 is configured to: determine a height of a feature (e.g., the copper or transparent thin film) on the workpiece 201. The workpiece 201 can be a flat panel, a semiconductor wafer, glass, or another substrate. The workpiece 201 includes a transparent thin film near or on the feature. The processor also is configured to correct the height from the measuring based on a thickness and a refractive index of the transparent thin film. This can use a phase shift correction. The inspection system 200 can further include a reflectometer configured to measure the thickness and the refractive index.

In some embodiments, various steps, functions, and/or operations of systems and the sub-systems and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor (or computer system) or, alternatively, multiple processors (or multiple computer systems). Moreover, different sub-systems of the system may include one or more computing or logic systems. Therefore, the above description should not be interpreted as a limitation on the present disclosure but merely an illustration.

In an instance, a non-transitory computer-readable storage medium includes one or more programs for executing steps on one or more computing devices. The steps include receiving a 3D surface map. The 3D surface map is determined using an interferometric quantitative phase imaging technique. The workpiece includes a transparent thin film or layers stack near or on the feature. The 3D surface map can be corrected based on a thickness and a refractive index of the transparent thin film or layers stack.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:

a stage configured to hold a workpiece;

an inspection system configured to perform an interferometric quantitative phase imaging; and a processor in electronic communication with the inspection system, wherein the processor is configured to:

determine a 3D surface map that includes height information in a 2D arrangement from a phase map, wherein the workpiece includes a transparent thin film or layers stack near or on a feature, and wherein the phase map is generated from phase imaging data; and correct at least one value in the height information of the 3D surface map based on a thickness and a complex refractive index of the transparent thin film or layers stack.

2. The system of claim 1, wherein the feature is a bump, a micro-bump, a pillar, a metal-nail, an electronic device, or a transparent feature.

3. The system of claim 1, wherein the workpiece is a semiconductor wafer, flat panel, printed circuit board, or glass substrate.

4. The system of claim 1, further including a reflectometer configured to measure the thickness and the refractive index.

5. The system of claim 1, wherein the correcting uses a phase shift correction.

6. The system of claim 5, wherein the transparent thin film or layers stack technique uses only one wavelength, dual wavelength, or multi-wavelength illumination.

7. The system of claim 1, wherein the interferometric quantitative phase imaging uses coherent illumination, non-coherent illumination, or partially-coherent illumination.

8. A method comprising:

determining a 3D surface map of a workpiece using an interferometric quantitative phase imaging technique, wherein the workpiece includes a transparent thin film or layers stack near or on a feature, and wherein the 3D surface map includes height information in a 2D arrangement;

measuring a thickness and a refractive index using a reflectometer; and correcting, using a processor, at least one value in the height information of the 3D surface map based on the thickness and the refractive index of the transparent thin film or layers stack.

9. The method of claim 8, wherein the feature is a bump, a micro-bump, a pillar, a metal-nail, an electronic device, or a transparent feature.

10. The method of claim 8, wherein the workpiece is a semiconductor wafer, flat panel, printed circuit board, or glass substrate.

11. The method of claim 8, wherein the correcting uses a phase shift correction.

12. The method of claim 11, wherein the transparent thin film or layers stack technique uses only one wavelength, dual wavelength, or multi-wavelength illumination.

13. The method of claim 8, wherein the interferometric quantitative phase imaging uses coherent illumination, non-coherent illumination, or partially-coherent illumination.

14. The method of claim 8, wherein the thickness is based on a measured phase difference between two points on the workpiece.

15. The method of claim 8, wherein the refractive index has a real part and an imaginary part.

16. A non-transitory computer-readable storage medium, comprising one or more programs for executing the following steps on one or more computing devices comprising:

determining a 3D surface map of a workpiece from data generated using an interferometric quantitative phase imaging technique, wherein the workpiece includes a transparent thin film or layers stack near or on a feature, and wherein the 3D surface map includes height information in a 2D arrangement;

correcting at least one value in the height information of the 3D surface map based on a thickness and a refractive index of the transparent thin film or layers stack.

17. The non-transitory computer-readable storage medium of claim 16, wherein the feature is a bump, a micro-bump, a pillar, a metal-nail, an electronic device, or a transparent feature.

18. The non-transitory computer-readable storage medium of claim 16, wherein the workpiece is a semiconductor wafer, flat panel, printed circuit board, or glass substrate.

19. The non-transitory computer-readable storage medium of claim 16 wherein the correcting uses a phase shift correction.

* * * * *